United States Patent
Sasson et al.

(10) Patent No.: US 11,940,969 B2
(45) Date of Patent: Mar. 26, 2024

(54) MANAGING LOCATIONS OF DERIVED STORAGE OBJECTS

(71) Applicant: INTERNATIONAL BUSINESS MACHINES CORPORATION, Armonk, NY (US)

(72) Inventors: Ben Sasson, North Baddesley (GB); Lee Jason Sanders, Chichester (GB); Gordon Douglas Hutchison, Eastleigh (GB); William J. Scales, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/664,880

(22) Filed: May 25, 2022

(65) Prior Publication Data
US 2023/0385260 A1    Nov. 30, 2023

(51) Int. Cl.
*G06F 16/22*    (2019.01)
*G06F 11/14*    (2006.01)
*G06F 16/28*    (2019.01)

(52) U.S. Cl.
CPC ...... *G06F 16/2246* (2019.01); *G06F 11/1448* (2013.01); *G06F 16/289* (2019.01)

(58) Field of Classification Search
None
See application file for complete search history.

(56) References Cited

U.S. PATENT DOCUMENTS

| | | | |
|---|---|---|---|
| 7,386,695 B2 | 6/2008 | Fuente | |
| 7,996,636 B1* | 8/2011 | Prakash | G06F 3/0619 711/170 |
| 8,549,051 B2 | 10/2013 | Ahrens | |
| 8,713,272 B2 | 4/2014 | Agombar | |
| 8,768,977 B2 | 7/2014 | Golab | |
| 9,881,040 B2 | 1/2018 | Rawat | |
| 11,055,179 B2 | 7/2021 | Chauhan | |

(Continued)

OTHER PUBLICATIONS

"Snapshots? Don't have a C-O-W about it!", Storage Gaga, Aug. 9, 2011, <https://storagegaga.wordpress.com/tag/redirect-on-write/>.

(Continued)

*Primary Examiner* — Dawaune A Conyers
(74) *Attorney, Agent, or Firm* — Eric W. Chesley

(57) ABSTRACT

Described are techniques for managing data locations of derived storage objects. The techniques include accessing a primary metadata tree providing a lookup path using a virtual address to locate data for a primary object in physical storage pointed to by a leaf node of the primary metadata tree and providing a sub-tree from a leaf node of the primary metadata tree associated with the primary object, the sub-tree providing lookup paths using virtual addresses for derived objects. Wherein a derived object is a view of the primary object at a specific point in time, with copy leaf nodes of the sub-tree pointing to stored data of the derived objects. The techniques further include maintaining an ancestry graph associated with the sub-tree with the ancestry graph linking derived object identifiers to provide an ancestral chain lookup to identify derived object identifiers of the closest stored physical data of a derived object.

20 Claims, 9 Drawing Sheets

(56) References Cited

U.S. PATENT DOCUMENTS

| | | | |
|---|---|---|---|
| 2010/0161557 A1* | 6/2010 | Anderson | G06F 16/128 |
| | | | 707/638 |
| 2016/0034508 A1 | 2/2016 | Aron | |
| 2018/0329785 A1 | 11/2018 | Mosek | |
| 2019/0129893 A1* | 5/2019 | Baird, III | G06F 16/2474 |
| 2019/0339883 A1 | 11/2019 | Aron | |
| 2020/0218454 A1* | 7/2020 | Hallak | G06F 3/064 |
| 2021/0286535 A1 | 9/2021 | Aldred | |

OTHER PUBLICATIONS

"Write Anywhere File Layout", Wikipedia, Wikimedia Foundation, Last edited on Jun. 15, 2021, Downloaded from the Internet on Apr. 19, 2022, 8 pgs., <https://en.wikipedia.org/wiki/Write_Anywhere_File_Layout>.

Berman, O., "Snapshot Copies: When to Use Them and When to Tier Them", NetApp, Oct. 4, 2020, 7 pgs., <https://cloud.netapp.com/blog/cts-blg-snapshot-copies-when-to-use-them-when-to-tier-them#:~:text=With%20the%20Redirect%20on%20Write,used%20by%20ONTAP%20Snapshot%20technology>.

De Guise, P., "Basics: Why Deduplication Block Size is Important", Data Protection Hub, Sep. 30, 2019, Copyright © 2022 Data Protection Hub, 12 pgs., <https://nsrd.info/blog/2019/09/30/basics-why-deduplication-block-size-is-important/>.

Mell et al., "The NIST Definition of Cloud Computing", National Institute of Standards and Technology, Special Publication 800-145, Sep. 2011, 7 pages.

Preston, W., "Snapshot 101: Copy-on-Write vs Redirect-on-Write", StorageSwiss.com—The Home of Storage Switzerland, Apr. 1, 2016, 6 pgs., <https://storageswiss.com/2016/04/01/snapshot-101-copy-on-write-vs-redirect-on-write/>.

* cited by examiner

MANAGING LOCATIONS OF DERIVED STORAGE OBJECTS

BACKGROUND

The present disclosure relates to storage systems, and more specifically, to managing locations of derived storage objects.

Customers with enterprise storage systems generally use some form of clone or snapshot capability provided by the storage controller. These clones or snapshots are used for development, test and data protection and can amount to many copies for a single logical object. The clones can either be separated in time (e.g., a clone per hour, day, etc.) or by purpose (e.g., clone a database for test).

Clones or snapshots are copies that generally share the same data (e.g., as the chances of changing an entire volume within an hour are slim). Thus, most storage controllers use some techniques to help stop the bloat of data from copies (excess data copies) from crippling the system. Such techniques include data deduplication and change bitmaps, for example.

However, each of these copies manages its own metadata structure to allow lookups, data access, and modifications. This is because each of the copies can be modified independently of the others or kept unchanged so as to point to the same data even if the parent changes.

SUMMARY

Aspects of the present disclosure are directed toward a computer-implemented method for managing data locations of derived storage objects comprising accessing a primary metadata tree providing a lookup path using a virtual address to locate data for a primary object in physical storage pointed to by a leaf node of the primary metadata tree. The method further comprises providing a sub-tree from a leaf node of the primary metadata tree associated with the primary object. The sub-tree provides lookup paths using virtual addresses derived objects, and a derived object is a view of the primary object at a specific point in time, with copy leaf nodes of the sub-tree pointing to stored data of the derived objects. The method further comprises maintaining an ancestry graph associated with the sub-tree with the ancestry graph linking derived object identifiers to provide an ancestral chain lookup to identify derived object identifiers of the closest stored physical data of an associated derived object.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
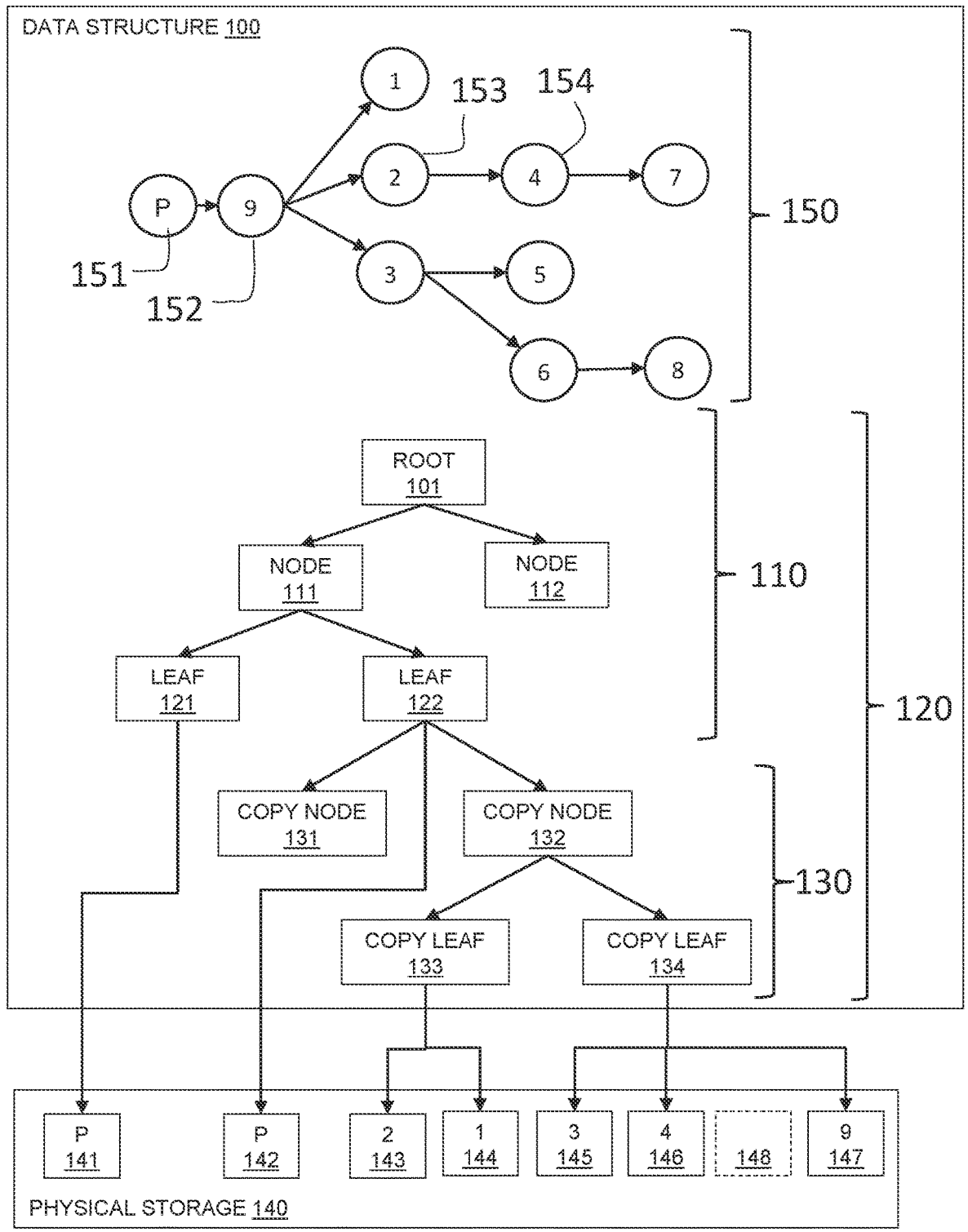
FIG. 1 is a schematic diagram of an example primary metadata tree and sub-tree, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described herein. On the contrary, the intention is to cover all modifications, equivalents, and alternatives falling within the spirit and scope of the present disclosure.

DETAILED DESCRIPTION

Aspects of the present disclosure are directed toward technologies for managing data locations of derived storage objects. While not limited to such applications, embodiments of the present disclosure may be better understood in light of the aforementioned context.

The technologies include a primary metadata tree providing a lookup path using a virtual address to locate a primary object's data in physical storage pointed to by a leaf node of the primary metadata tree. For example, the primary metadata tree can be part of an implementation supporting Write Anywhere File Layout (WAFL). In addition, a sub-tree is provided from a leaf node of the primary metadata tree, wherein the leaf node points to a primary object's data in physical storage. The sub-tree is a metadata tree for derived object identifiers of the primary object with leaf nodes of the sub-tree pointing to physical locations of data of the derived objects, where the data for a particular address differs from the primary object's data at the same address. An ancestry graph is maintained for the sub-tree to provide a lookup for stored data of the derived objects. The ancestry graph provides ancestry chains of references to the physical locations of the data of derived objects that have evolved over multiple writes. The ancestry graph can alternatively be referred to as a dependency graph.

A primary object is a data object comprising a region of physical storage that contains a value or group of values. Each value in the region of physical storage can be accessed using an identifier or a more complex expression that refers to the data object. The term "derived object" is a view of the primary object at a specific point in time, such as snapshots, clones, or backups of primary objects, such as storage volumes. Derived objects can be mutable or immutable, can track changes to themselves (e.g., a write from the host to the derived object, for example, a test copy of data), or can maintain a point-in-time view of the primary/parent object (e.g., becoming a host to overwritten data in parent).

Many enterprise storage systems can use some form of clone or snapshot capability provided by a storage controller to preserve and utilize data objects. These clones and snapshots can amount to many copies for a single logical data object. Because each of these copies of the data object can be modified independently of one another, a metadata structure may have to be managed for each of the copies to allow lookups, data access, and data modifications.

Advantageously, aspects of the present disclosure overcome these challenges by managing each primary object with a dual-metadata tree, which includes a primary metadata tree for locating the primary object in physical storage, and sub-trees provided from leaf nodes of the primary metadata tree are used to manage data objects derived from the primary object. A main lookup path can use a virtual address to locate the primary object's data, while derived objects can be managed on a per-virtual address (e.g., a Logical Block Address (LBA)) basis as a sub-tree. This allows the structure to perform a very quick lookup for the primary object while enabling a derived object's lookup using an ancestry chain of an associated ancestry graph of the sub-tree.

Advantageously, these aspects of the present disclosure can reduce or eliminate metadata bloat (e.g., data storage that is occupied by excess metadata which could otherwise be reclaimed for other uses), while also supporting large numbers of copies (hundreds, thousands, or more) per data object, without a significant impact on overall system performance or space utilization, other than what is needed to present the correct data to the user. That is, using the dual-metadata tree of the present disclosure can reduce the number of copies for a single logical data object that is stored on physical storage, which increases the amount of storage that is available to the system. Accordingly, the management of data locations of derived storage objects is an improvement in the technical field of storage systems generally, and more particularly, in the technical field of providing efficient data storage.

Referring to FIG. 1, an example data structure 100 of a primary metadata tree 110 and a sub-tree 130 with an ancestry graph 150 of associated ancestry chains of the sub-tree 130 is shown in accordance with some embodiments of the present disclosure. The primary metadata tree 110 has a root node 101 with intermediate nodes 111, 112 up to leaf nodes 121, 122. The intermediate nodes 111, 112 are part of the tree implementation and point to other intermediate nodes or to leaf nodes 121, 122. The primary metadata tree 110 can be in the form of known metadata trees, where lookup is done using the virtual address of a primary object (LBA). The leaf nodes 121, 122 contain pointers to the physical location of the primary data 141, 142 in physical storage 140.

Below the primary metadata tree 110, a copy sub-tree 130 is provided from a leaf node 121 with the leaf node 121 pointing to the sub-tree 130 (only the sub-tree 130 of leaf node 122 is shown in FIG. 1). The primary metadata tree 110 and the sub-tree 130 form a dual-tree 120 for the lookup of derived objects of the primary object. A sub-tree 130 can be provided from each leaf node 121, 122. The sub-tree 130 maps a derived object of a copy leaf node 133 of the sub-tree 130 to physical locations 143, 144 of the data in the physical storage 140 that are used by the specific derived object and which are different from the primary object 142. The physical locations 143-147 are referenced by derived object identifiers (in FIG. 1 the derived object identifiers are shown as 1-9) that are used in the ancestry graph 150. (The derived object identifiers are referred to as copy IDs in the example below.)

The ancestry graph 150 defines ancestry information of the physical locations of derived objects by linking derived object identifiers and therefore forms a superset of user-defined objects (e.g., when a user chooses to create a copy, clone, etc.). The derived object identifiers do not map directly to user-defined copies. The ancestry graph 150 is a superset because a system process can choose to inject an object to better maintain chains. The ancestry graph 150 includes nodes 151-154 of derived object identifiers. Intermediate nodes (e.g., node 9 152) can be injected into the ancestry graph 150 to reduce overhead later. These objects are not user-accessible and are completely logical and internal.

A copy leaf is added to the sub-tree 130 when a new derived object is created, and also, when a write is made to an existing derived object. It should be noted that the derived object identifiers do not map directly to the user defined copies, but instead refer to pieces of data relevant to (associated with) an object derived from the primary object. The sub-tree 130 is used to locate a derived object's virtual address (LBA). The sub-tree 130 is therefore a search tree where the key is the ancestry chain to lookup the most concrete data.

On lookup, a dual-tree 120 for the primary object, which is formed of the primary tree 110 and the sub-tree 130 from the primary object leaf node 122, is provided with the ancestry chain for the relevant derived objects. The dual-tree 120 attempts to locate the most "concrete" data (e.g., data belonging to the object in the chain closest to the derived object the read is trying to read from).

Lookups start at the root node 101 and the dual-tree 120 is provided with the virtual address of the primary object (LBA) and the entire ancestry chain of the derived object identifier [copy id0, copy id1, copy id2, . . . copy idN]. Therefore, the lookup is provided with (LBA, [copy id0, copy id1, copy id2, . . . copy idN]). For example, if a read is from copy 4, the process will provide the sub tree with the ancestry chain [4, 2, 9, P] (154, 153, 152, 151).

The sub-tree 130 is formed of copy nodes 131, 132 and copy leaves 133, 134. The copy leaves 133, 134 include pointers to stored data 143-147 based on the data identifier (also referred to herein as a copy id). If a data identifier has no data 148, the lookup will fall back the ancestry chain from the data identifier of the derived copy.

An interesting aspect of the technologies is splitting a data chunk between a derived object and the primary object (e.g., between a copy and the parent volume), and how reading obtains the correct piece of data relevant to a specific derived object, which is described in more detail further below.

Figure 2:
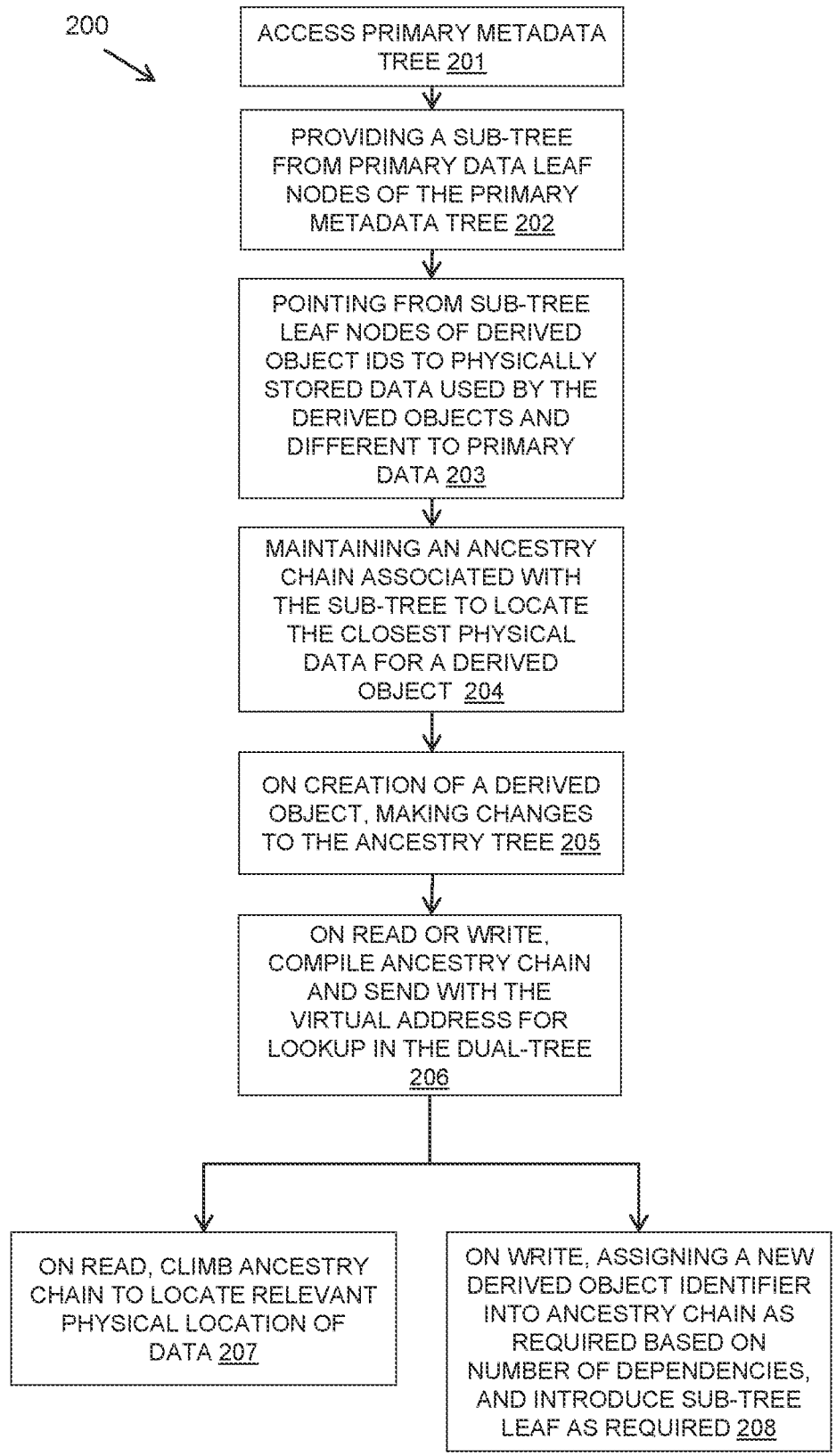
FIG. 2 is a flow diagram of an example method for managing data locations of derived storage objects, in accordance with some embodiments of the present disclosure.

Referring to FIG. 2, a flow diagram 200 shows an example of a method for managing data locations of derived storage objects.

The method accesses 201 a primary metadata tree giving a lookup path using a virtual address to locate a primary object's data in physical storage pointed to by a leaf node of the primary metadata tree. This can be a known primary metadata tree for primary object data.

The method provides 202 a sub-tree from a primary data's leaf node of the primary metadata tree. The sub-tree stores metadata of derived objects of the primary object with the copy nodes of the sub-tree representing derived object identifiers and the copy leaf nodes pointing 203 to physical locations of data used by the derived objects and different to the primary data. A sub-tree in combination with the primary metadata tree provides a dual-tree for lookup of derived objects.

An ancestry chain is maintained 204 associated with the sub-tree derived object identifiers to locate the closest physical data stored for a derived object.

On creating a derived object, the method stores 205 ancestry information for the new derived object in the ancestry chain. When the user creates a derived object, it is inserted in the correct place in the ancestry tree.

On reading or writing a derived object 206, the method compiles the ancestry chain relevant to the IO and sends it along with the virtual address to be resolved in the dual-tree. Alternatively multiple lookups can be performed on the sub-tree, each with just one derived object identifier and repeated for the entire chain; however, this is not as efficient as transmitting the entire chain along with the lookup and letting the tree resolve it.

On reading a derived object 207, the method climbs the ancestry chain from the derived object identifier to locate a physical location of the relevant data. The sub-tree attempts to locate the data belonging to the derived object closest in the chain to the derived object of the IO. Accordingly, if the ancestry chain is [4,2,1], after locating the LBA's leaf, the sub-tree will first try to locate data owned by 4, then 2 and then 1.

On writing a derived object 208, the write will manipulate the sub-tree to include or update the relevant derived object identifiers with pointers to the most concrete data. The method determines if the derived object has dependents, injecting an intermediate derived object identifier into the ancestry chain when required, and assigns an existing pointer to the new derived object identifier. When writes occur, they can introduce leaves into the sub-tree with a <derived-id> key.

The read and write operations are described in more detail in relation to FIG. 3 below.

Figure 3:
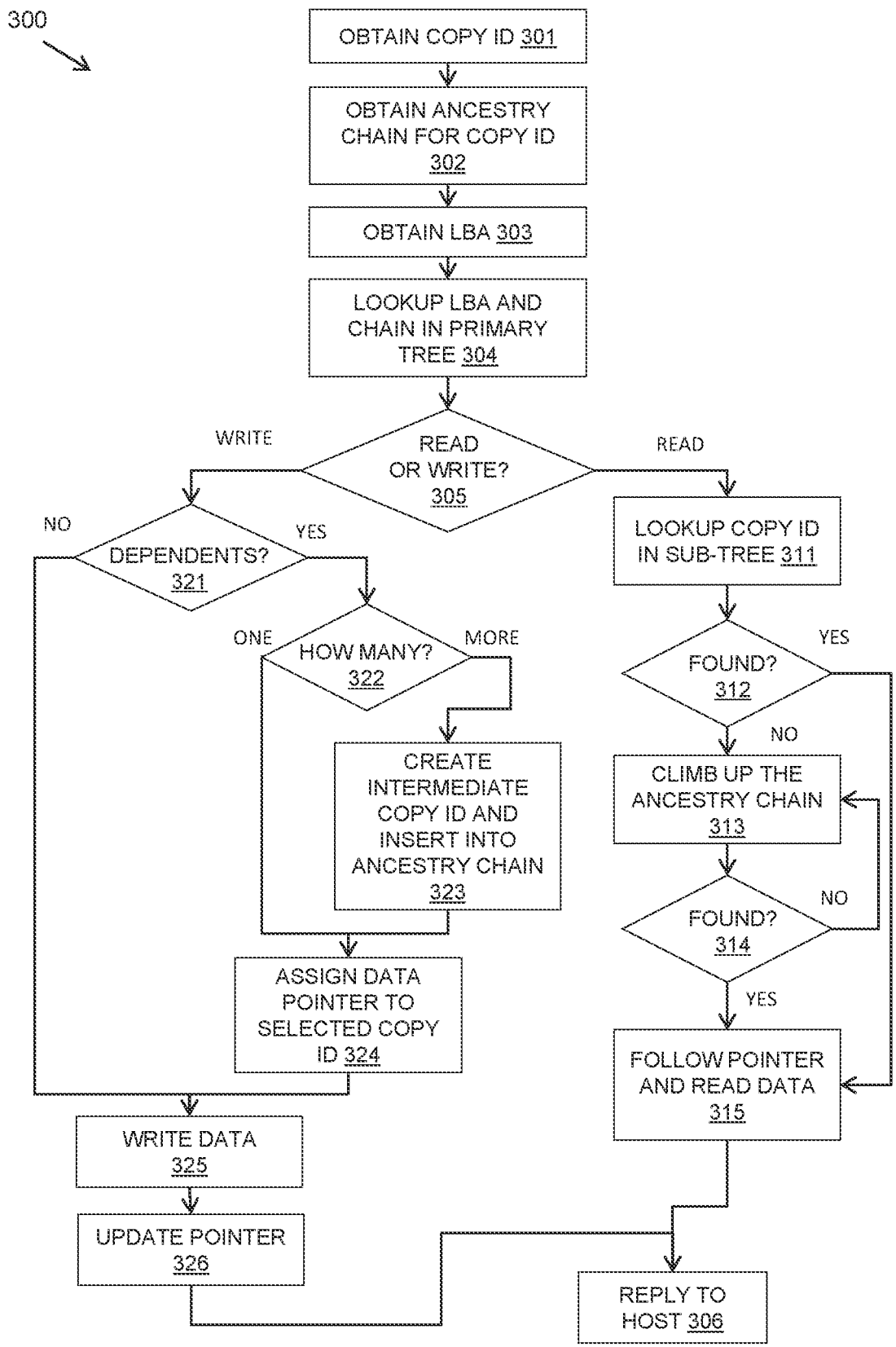
FIG. 3 is a flow diagram of another example method for managing data locations of a derived storage object using read and writes to the derived storage object, in accordance with some embodiments of the present disclosure.

FIG. 3 provides a host input/output flow diagram 300 according to an example method for read and writes to a derived object, which in this example, is a data copy of data having an LBA.

The method obtains 301 a copy ID for the data copy and obtains 302 an ancestry chain for the copy ID. The method obtains 303 an LBA for a data copy and looks up 304 the LBA together with the ancestry chain.

The method determines 305 if the operation is a read or a write.

For a read, the copy ID is looked up 311 in the sub-tree to find a copy leaf node. If the copy ID has no data found 312, the lookup climbs up 313 the ancestry chain to find a next Copy ID for the data. This is repeated if no data is found 314. The lookup goes up the dependencies of the ancestry chain until a relevant copy ID with data is found and a pointer is followed 315 from the copy leaf node of the sub-tree to read the data from physical storage. A reply is then sent to the host 306. Referring back to 312, if the copy ID has data found, a pointer is followed 315 from the copy leaf node of the sub-tree to read the data from physical storage. A reply is then sent to the host 306.

For a write, the method determines 321 if there are dependents of the copy ID in the ancestry chain. If there are no dependents, the method writes 325 the data and updates 326 the pointer in the copy leaf node, and a reply is sent to the host 306.

If there are dependents of the copy ID, it is determined 322 how many dependents there are. If there is one dependent, the method assigns 324 a data pointer to a selected copy ID, writes 325 the data and updates 326 the pointer in the copy leaf node, and sends a reply to the host 306. If there are more than one dependent, the method creates 323 an intermediate copy ID and inserts this into the ancestry chain. The method assigns 324 the existing pointer of the copy leaf node to the new copy ID, writes 325 the data and updates 326 the pointer in the copy leaf node, and sends a reply to the host 306.

Figure 4A:
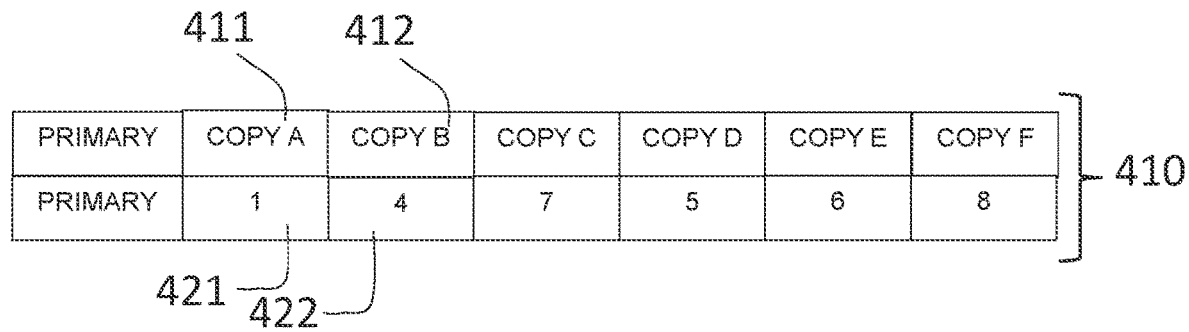
FIG. 4A is a schematic diagram of an example sub-tree, in accordance with some embodiments of the present disclosure.
Figure 4A:
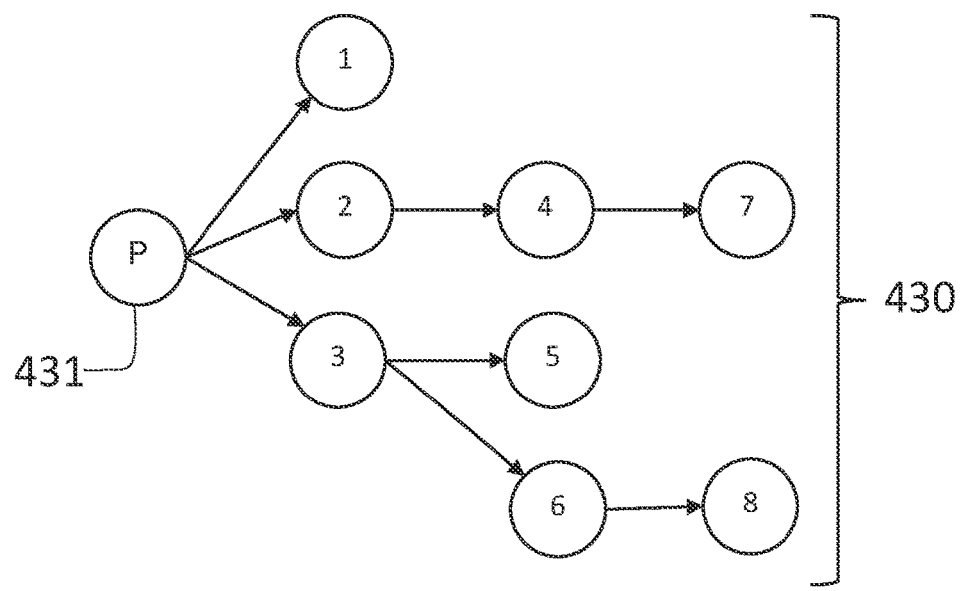

Referring to FIG. 4A, a mapping 410 of copies 411 to copy IDs 421 is shown with an ancestry graph 430 of copy IDs stemming from a primary object 431.

Figure 4B:
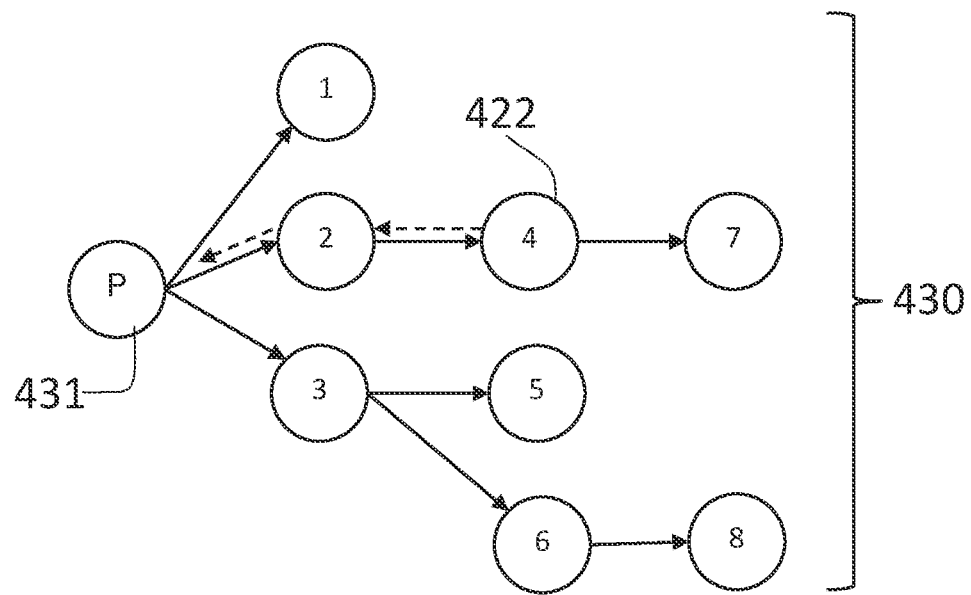
FIG. 4B is a schematic diagram of the sub-tree of FIG. 4A illustrating a read, in accordance with some embodiments of the present disclosure.

Referring to FIG. 4B, a lookup order for Copy B 412 is shown. On read, the LBA is looked up and the copy ID "4" 422 is found and then the lookup climbs up the ancestry chain from "4", to "2", and then to "1" until a relevant data record is found.

Figure 4C:
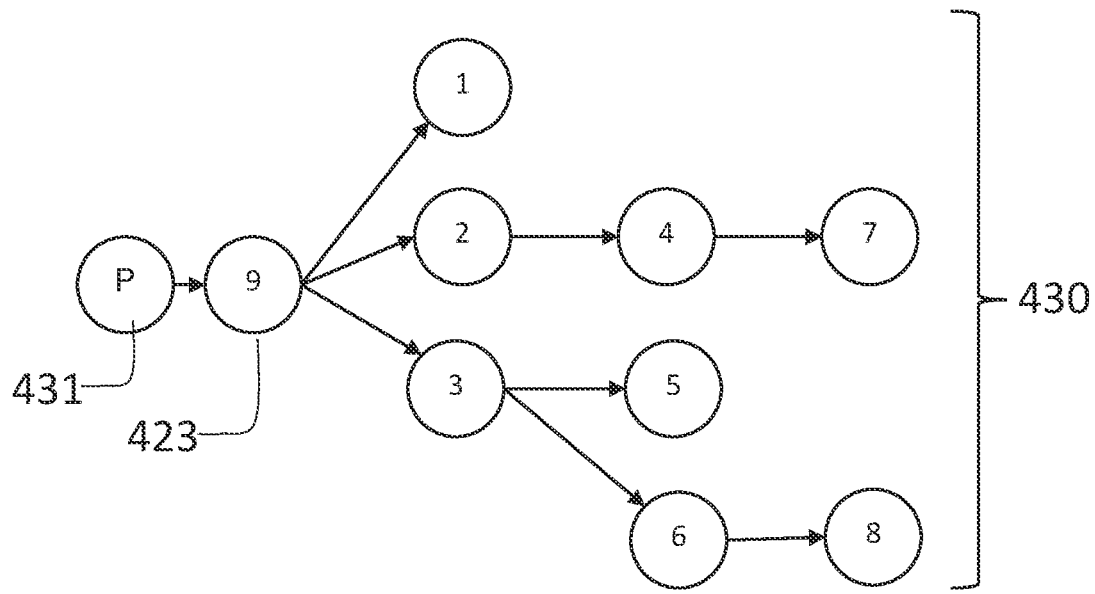
FIG. 4C is a schematic diagram of the sub-tree of FIG. 4A illustrating a write, in accordance with some embodiments of the present disclosure.

Referring to FIG. 4C, the resultant dependency graph 430 is shown for a write operation. In FIG. 4A, the primary object 431 has three dependencies "1", "2", and "3". A new node 423 is inserted into the ancestry graph 430 (shown as copy ID "9") to unify the dependencies. Once the volume has only one dependent, a sub-tree lookup is performed to establish the amount of non-split dependents and to move data to its sub-tree with a correct reference count. This is optional, and if it is not carried out, some garbage collection may be needed to clean it up.

When an object has more than one dependent and data is being overwritten, in theory the data needs to be cascaded to all dependents. This can be an expensive operation that may not be scalable. Instead, a virtual dependent is inserted between them, so the real dependents now depend on the virtual dependent, and the virtual dependent is the only dependent of the parent. Once this is done, only the overwritten data is moved to be owned by that object and the lookup is relied upon using the ancestry chain to resolve it for future IO's.

The intermediate nodes are not host-accessible copies, so they do not receive writes of their own once established, so no further dependent splits are needed.

The benefits of the described method are that no additional IO is needed on copy create, only metadata operations are performed (likely only in memory) on split of a dependent.

The described method supports an unlimited number of copies, independent of the main copied object. The method allows for the creation of virtually unlimited number of snapshots per parent/source object, including generations, managed on an address level and supporting data deduplication. Furthermore, the method describes a much more efficient method for locating all the generations of a data for a specific address and for removing copies from the middle of the chain.

Figure 5:
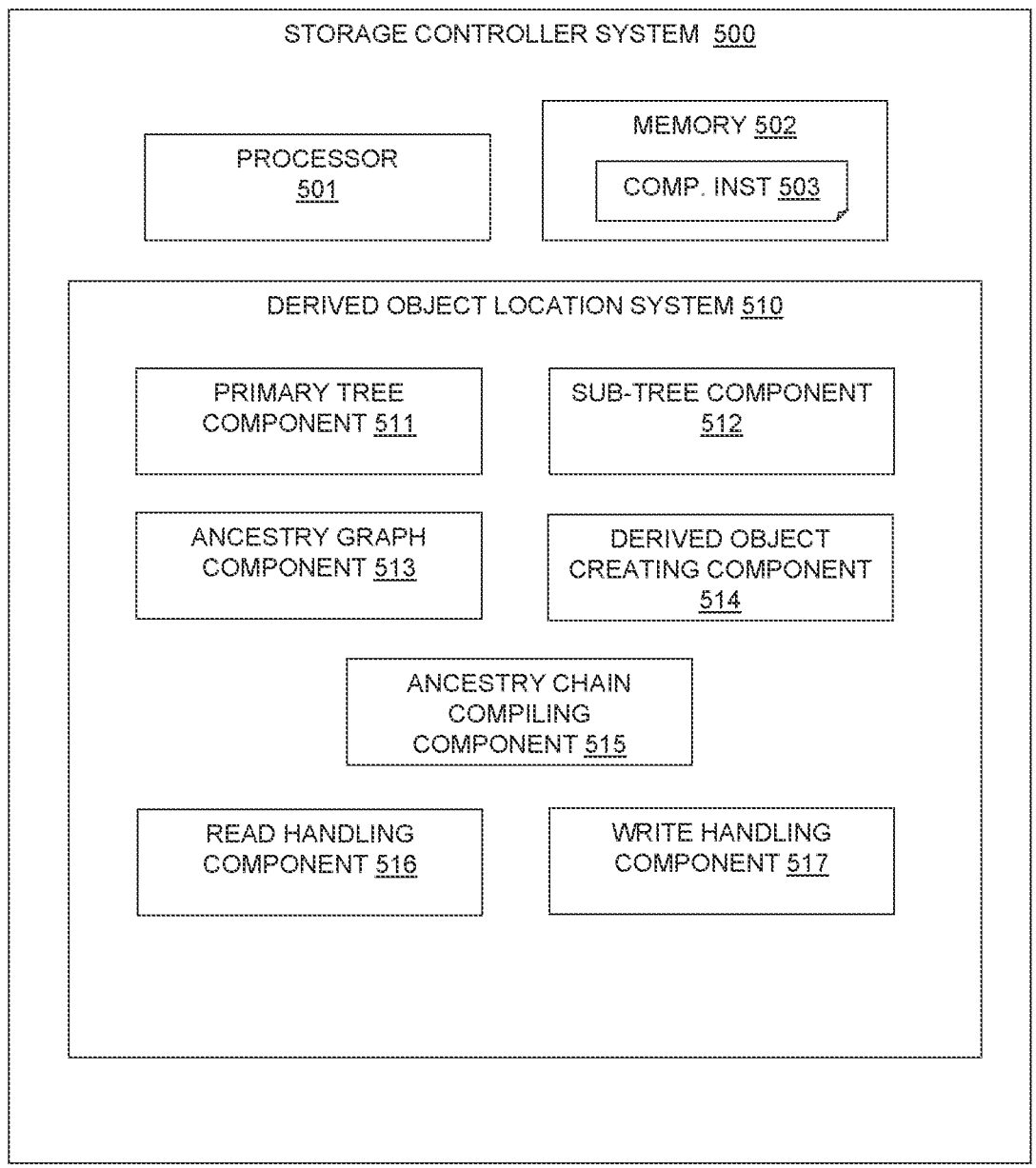
FIG. 5 is block diagram of an example system for managing data locations of derived storage objects, in accordance with some embodiments of the present disclosure.

Referring to FIG. 5, a block diagram shows a storage controller system 500 at which the described system can be provided. The storage controller system 500 includes at least one processor 501, a hardware module, or a circuit for executing the functions of the described components, which can be software units executing on the at least one processor 501. Multiple processors running parallel processing threads can be provided enabling parallel processing of some or all of the functions of the components. Memory 502 can be configured to provide computer instructions 503 to the at least one processor 501 to carry out the functionality of the components.

The storage controller system 500 includes a derived object location system 510 for managing data locations of derived storage objects. The derived object location system 510 includes a primary tree component 511 for accessing a primary metadata tree, which provides a lookup path using a virtual address to locate a primary object's data in physical storage, wherein the primary object's data in physical storage is pointed to by a leaf node of the primary metadata tree.

The derived object location system 510 also includes a sub-tree component 512 for providing a sub-tree from the primary data's leaf node of the primary metadata tree. The sub-tree provides lookup paths using virtual addresses of derived objects, wherein a derived object is a view of the primary object at a specific point in time, with copy leaf nodes of the sub-tree pointing to stored data of the derived objects.

The derived object location system 510 also includes an ancestry graph component 513 for maintaining an ancestry graph associated with the sub-tree with the ancestry graph linking derived object identifiers to provide an ancestral chain lookup to identify derived object identifiers of the closest stored physical data of a derived object.

The derived object location system 510 also includes a derived object creation component 514 for, on creating a new derived object, storing dependency information of a new derived object identifier for the new derived object in the ancestry graph.

The derived object location system 510 also includes an ancestry chain compiling component 515 for, on reading or writing a derived object, compiling an ancestry chain of the ancestry graph for the derived object identifier and sending the ancestry chain with the virtual address of the derived object for lookup in sub-tree.

The derived object location system 510 also includes a read handling component 516 for, on reading a derived object, climbing the ancestral chain from the derived object identifier to identify a derived object identifier of the closest stored physical data of the derived object being read in order to locate a relevant physical location of the data. The read handling component 516, on reading a derived object: looks up the derived object identifier in the sub-tree to find a copy leaf node; follows pointers from the copy leaf node to stored physical data for the derived object identifier; and when the derived object identifier has no physical data found, climbs up the ancestry chain to find a next derived object identifier to locate relevant stored data.

The derived object location system 510 also includes a write handling component 517 for, on writing a derived object, manipulating the sub-tree to include or update the relevant derived object identifiers with pointers to the most relevant physical data. The write handling component 517, on writing a derived object: determines if the derived object has dependents; and, when there is more than one dependent, injects an intermediate derived object identifier into the ancestry chain and assigns a pointer from the copy leaf node of the derived object to the selected derived object identifier in physical storage; or, when there is one dependent, assigns a pointer from the copy leaf node of the derived object to the selected derived object identifier in physical storage.

Figure 6:
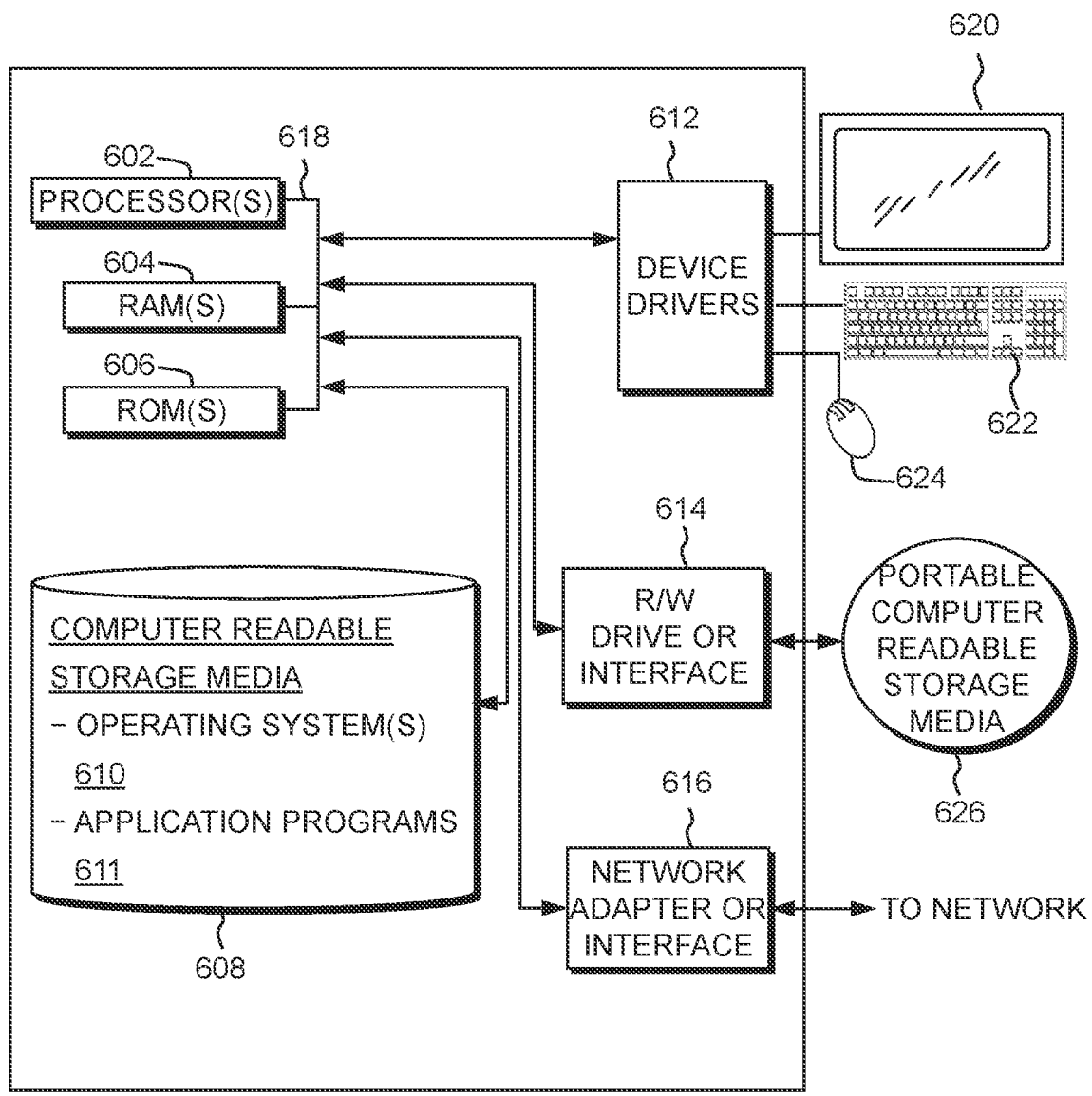
FIG. 6 is a block diagram of an example computer system or cloud server in which some embodiments of the present disclosure can be implemented.

FIG. 6 depicts a block diagram of components of a computing system as used for the storage controller system 500, in accordance with an embodiment of the present disclosure. It should be appreciated that FIG. 6 provides only an illustration of one implementation and does not imply any limitations with regard to the environments in which different embodiments can be implemented. Many modifications to the depicted environment can be made.

The computing system can include one or more processors 602, one or more computer-readable RAMs 604, one or more computer-readable ROMs 606, one or more computer readable storage media 608, device drivers 612, read/write drive or interface 614, and network adapter or interface 616, all interconnected over a communications fabric 618. Communications fabric 618 can be implemented with any architecture designed for passing data and/or control information between processors (such as microprocessors, communications and network processors, etc.), system memory, peripheral devices, and any other hardware components within the system.

One or more operating systems 610, and application programs 611, are stored on one or more of the computer readable storage media 608 for execution by one or more of the processors 602 via one or more of the respective RAMs 604 (which typically include cache memory). In the illustrated embodiment, each of the computer readable storage media 608 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the present disclosure.

The computing system can also include a R/W drive or interface 614 to read from and write to one or more portable computer readable storage media 626. Application programs 611 on the computing system can be stored on one or more of the portable computer readable storage media 626, read via the respective RAY drive or interface 614 and loaded into the respective computer readable storage media 608.

The computing system can also include a network adapter or interface 616, such as a TCP/IP adapter card or wireless communication adapter. Application programs 611 on the computing system can be downloaded to the computing device from an external computer or external storage device via a network (e.g., the Internet, a local area network or other wide area networks or wireless networks) and network adapter or interface 616. From the network adapter or interface 616, the programs can be loaded into the computer readable storage media 608. The network can comprise copper wires, optical fibers, wireless transmission, routers, firewalls, switches, gateway computers and edge servers.

The computing system can also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, RAY drive or interface 614, and network adapter or interface 616 can comprise hardware and software stored in computer readable storage media 608 and/or ROM 606.

The present disclosure can be a system, a method, and/or a computer program product at any possible technical detail level of integration. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (e.g., through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be accomplished as one step, executed concurrently, substantially concurrently, in a partially or wholly temporally overlapping manner, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
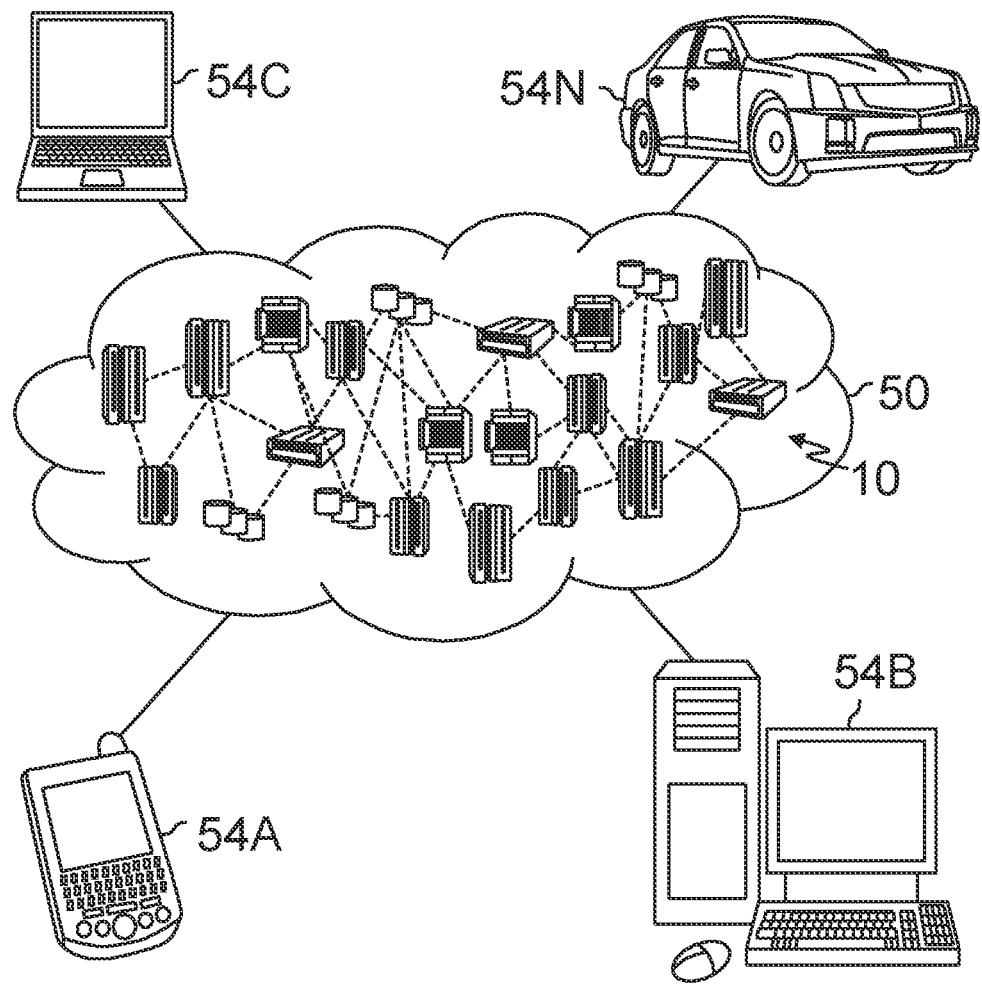
FIG. 7 is a schematic diagram of a cloud computing environment in which some embodiments of the present disclosure can be implemented.

Referring now to FIG. 7, an illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
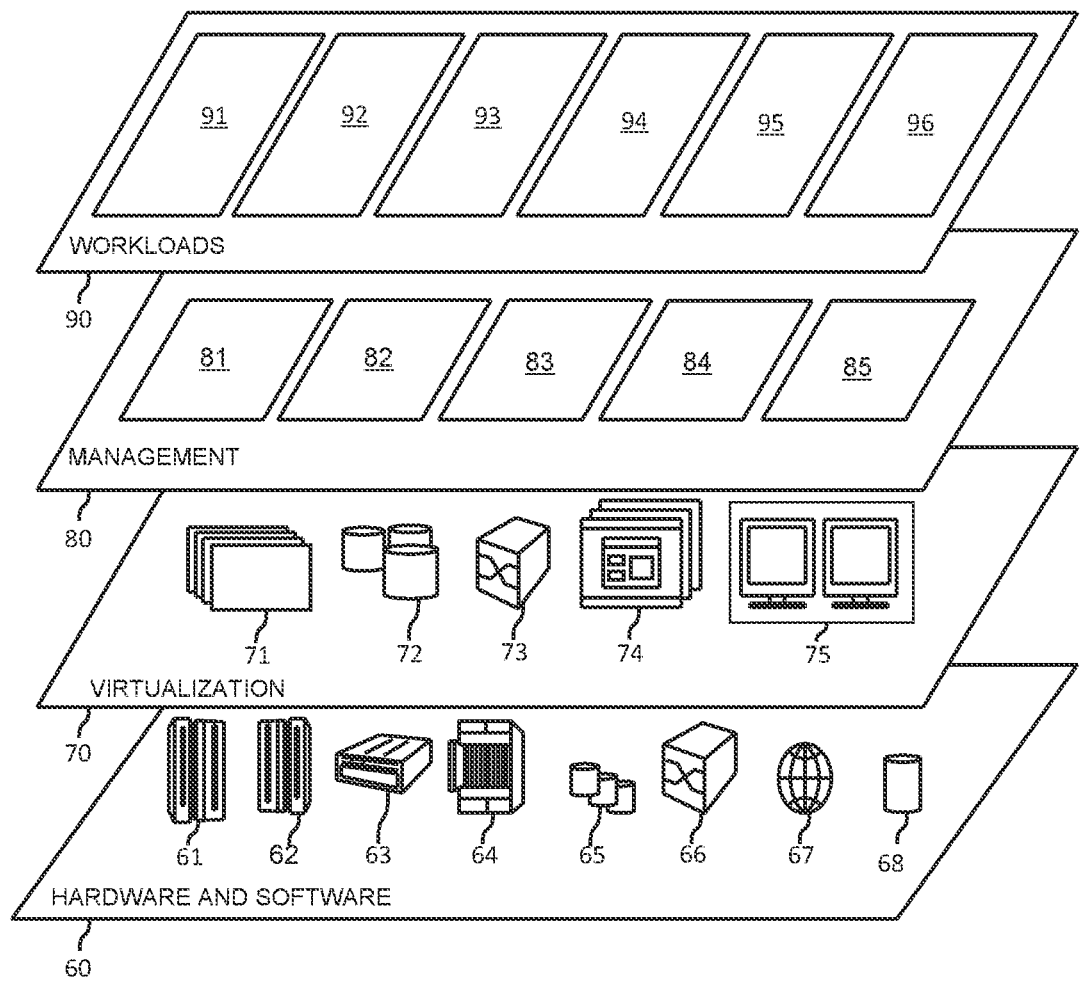
FIG. 8 is a diagram of abstraction model layers of a cloud computing environment in which some embodiments of the present disclosure can be implemented.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and derived storage object location processing 96.

A computer program product of the present disclosure comprises one or more computer readable hardware storage devices having computer readable program code stored therein, said program code executable by one or more processors to implement the methods of the present disclosure.

A computer system of the present disclosure comprises one or more processors, one or more memories, and one or more computer readable hardware storage devices, said one or more hardware storage device containing program code executable by the one or more processors via the one or more memories to implement the methods of the present disclosure.

Embodiments of the present disclosure can be a computer program product. The computer program product can include a computer readable storage medium (or media) having computer readable program instructions thereon for causing a processor to carry out aspects of the present disclosure.

Embodiments of the present disclosure can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present disclosure.

What is claimed is:

1. A computer-implemented method for managing data locations of derived storage objects, comprising:
   accessing, using at least one processor, a primary metadata tree providing a lookup path using a virtual address to locate data for a primary object in physical storage pointed to by a leaf node of the primary metadata tree;

providing, using the at least one processor, a sub-tree from a leaf node of the primary metadata tree associated with the primary object, the sub-tree providing lookup paths using virtual addresses for derived objects using copy nodes to represent derived object identifiers for objects derived from the primary object, and copy leaf nodes to point to physical storage locations of the derived objects, wherein a derived object is a view of the primary object at a specific point in time, and wherein the sub-tree is provided to reduce a number of copies of the primary object stored on the physical storage; and maintaining, using the at least one processor, an ancestry graph associated with the sub-tree with the ancestry graph linking derived object identifiers to provide an ancestral chain lookup to identify derived object identifiers of closest stored physical data of an associated derived object.

2. The method of claim 1, wherein on creating a new derived object:
storing dependency information of a new derived object identifier for the new derived object in the ancestry graph.

3. The method of claim 1, wherein on reading or writing a derived object:
compiling an ancestry chain of the ancestry graph for a derived object identifier and sending the ancestry chain with a virtual address of the derived object for lookup in the sub-tree.

4. The method of claim 3, wherein on reading the derived object:
climbing the ancestral chain from the derived object identifier to identify a derived object identifier of closest stored physical data of the derived object being read to locate a relevant physical location of the data.

5. The method of claim 4, wherein on reading the derived object:
looking up the derived object identifier in the sub-tree to find a copy leaf node;
following pointers from the copy leaf node to stored physical data for the derived object identifier; and
when the derived object identifier has no physical data found, climbing up the ancestry chain to find a next derived object identifier to locate relevant stored data.

6. The method of claim 1, wherein on writing a derived object:
manipulating the sub-tree to include relevant derived object identifiers with pointers to most relevant physical data.

7. The method of claim 1, wherein on writing a derived object:
determining that the derived object has more than one dependent; and
injecting an intermediate derived object identifier into the ancestry chain and assigning a pointer from a copy leaf node of the derived object to a selected derived object identifier in the physical storage.

8. The method of claim 1, wherein on writing a derived object:
determining that the derived object has one dependent; and
assigning a pointer from a copy leaf node of the derived object to a selected derived object identifier in the physical storage.

9. The method of claim 1, wherein the derived objects relate to at least one selected from a group consisting of: a snapshot copy, a clone, and a backup of the primary object.

10. A computer program product comprising one or more computer readable storage media, and program instructions collectively stored on the one or more computer readable storage media, the program instructions comprising instructions executable by at least one processor for:
accessing a primary metadata tree providing a lookup path using a virtual address to locate data for a primary object in physical storage pointed to by a leaf node of the primary metadata tree;
providing a sub-tree from a leaf node of the primary metadata tree associated with the primary object, wherein the sub-tree provides derived object identifiers for objects derived from the primary object, with a copy leaf node of the sub-tree a sub-tree from the primary data's leaf node of the primary metadata tree, wherein the sub-tree provides lookup paths using virtual addresses for derived objects using copy nodes to represent derived object identifiers for objects derived from the primary object, and copy leaf nodes to point to physical storage locations of the derived objects, wherein a derived object is a view of the primary object at a specific point in time, and wherein the sub-tree is provided to reduce a number of copies of the primary object stored on the physical storage; and
maintaining an ancestry graph associated with the sub-tree with the ancestry graph linking derived object identifiers to provide an ancestral chain lookup to identify derived object identifiers of closest stored physical data of an associated derived object.

11. The computer program product of claim 10, wherein the sub-tree is a search tree with a key provided by an ancestral chain compiled from the ancestry graph on lookup.

12. A system for managing data locations of derived storage objects, comprising:
one or more computer readable storage media storing program instructions and one or more processors configured to execute the program instructions comprising:
accessing a primary metadata tree providing a lookup path using a virtual address to locate data for a primary object in physical storage pointed to by a leaf node of the primary metadata tree;
providing a sub-tree from a leaf node of the primary metadata tree associated with the primary object, wherein the sub-tree provides lookup paths using virtual addresses for derived objects using copy nodes to represent derived object identifiers for objects derived from the primary object, and copy leaf nodes to point to physical storage locations of the derived objects, wherein a derived object is a view of the primary object at a specific point in time, and wherein the sub-tree is provided to reduce a number of copies of the primary object stored on the physical storage; and
maintaining an ancestry graph associated with the sub-tree with the ancestry graph linking derived object identifiers to provide an ancestral chain lookup to identify derived object identifiers of closest stored physical data of an associated derived object.

13. The system of claim 12, wherein on creating a new derived object, storing dependency information of a new derived object identifier for the new derived object in the ancestry graph.

14. The system of claim 12, wherein on reading or writing a derived object, compiling an ancestry chain of the ancestry graph for the derived object identifier and sending the ancestry chain with the virtual address of the derived object for lookup in the sub-tree.

15. The system of claim 14, wherein on reading the derived object, climbing the ancestral chain from the derived object identifier to identify a derived object identifier of the closest stored physical data of the derived object being read to locate a relevant physical location of the data.

16. The system of claim 15, wherein on reading the derived object:
looking up the derived object identifier in the sub-tree to find a copy leaf node;
following pointers from the copy leaf node to stored physical data for the derived object identifier; and
when the derived object identifier has no physical data found, climbing up the ancestry chain to find a next derived object identifier to locate relevant stored data.

17. The system of claim 12, wherein on writing a derived object, manipulating the sub-tree to include relevant derived object identifiers with pointers to most relevant physical data.

18. The system of claim 12, wherein on writing a derived object:
determining that the derived object has more than one dependent; and
injecting an intermediate derived object identifier into the ancestry chain and assigning a pointer from the copy leaf node of the derived object to a selected derived object identifier in the physical storage.

19. The system of claim 12, wherein on writing a derived object:
determining that the derived object has one dependent; and
assigning a pointer from a copy leaf node of the derived object to a selected derived object identifier in the physical storage.

20. The system of claim 12, wherein the derived objects relate to at least one selected from a group consisting of: a snapshot copy, a clone, and a backup of the primary object.

* * * * *